Patented May 22, 1934

1,959,448

UNITED STATES PATENT OFFICE 1,959,448

PROCESS OF EXTRACTING THE IMPURITIES FROM MINERAL RAW MATERIALS

Richard Staufer and Kamillo Konopicky, Vienna, Austria, assignors to the firm Alterra, A. G., of Luxemburg, a company of Luxemburg No Drawing. Application May 2, 1930, Serial No. 449,351. In Austria May 6, 1929

9 Claims. (Cl. 252—8)

We have filed an application in Austria on the 6th May 1929.

This invention relates to a process of extracting the impurities, such as iron, calcium and magnesium compounds, from mineral raw materials and is applicable in connection with all mineral raw materials the iron contents of which are attackable by acids, while the contents of lime and magnesia ought to be present essentially in the form of carbonates. Particularly the following raw materials come into consideration, viz: clays, kaolins, quartz, gritstone, infusorial earth, silicates of the group of feldspars and argillaceous schist, further silicates of the group of serpentines and amphiboles, particularly asbestos, and finally heavy spar, celestine, bauxite, oxidical iron ores.

Heretofore proposals have been made to extract the iron by treating the crushed minerals with hydrochloric acid, sulphuric acid or sulphurous acid. It is however troublesome to carry out the treatment with hydrochloric acid on an industrial scale because the use of this acid renders practically impossible the use of metallic reaction-vessels. The treatment with sulphuric acid is disadvantageous in that the acid, after having been used repeatedly, enriches itself with ferric salts and the latter considerably reduce the capability of reaction of the acid. Sulphurous acid though it dissolves for instance iron in the form of phosphates and ferric hydrate, does not dissolve such iron oxides that have lost their capability of reaction by ageing, and which are often found in minerals.

Now, we have discovered that sulphuric acid gives a mixed solvent of high efficiency for the purpose in question when incorporated with an appropriate amount of ferrous sulphate. With such an admixture the dissolving action of dilute sulphuric acid, which by itself is a weaker acid than hydrochloric acid, on oxydic iron compounds attains that of concentrated hydrochloric acid under the most favorable conditions.

Therefore an essential feature of the present invention consists in treating the mineral raw materials of the kind set forth, while applying heat, with a mixture of sulphuric acid and ferrous sulphate.

A further feature of the present invention consists in extracting from the said mineral raw materials not only iron but also lime and magnesia, this being effected by treating the suitably crushed raw material with aqueous sulphurous acid; this may for instance be done by introducing sulphur dioxide gas into an aqueous suspension of the said raw material, the introduction being effected at ordinary or increased pressure and ordinary or slightly raised temperature. This treatment is continued until the evolution of gaseous carbonic acid ceases. Then the mineral powder is separated from the solution, the latter containing the lime and magnesia compounds as bisulphites in a dissolved state. By this treatment an extraction of iron is not effected in a substantial degree nor is this aimed at in performing this step as the extraction of iron is carried out by the following treatment with the mixture of acid and a ferrous salt.

The process according to the present invention is described in the following more particularly in connection with clay, this material having been chosen because it contains the three impurities named above. First the sand usually contained in the clay is separated by washing. Then the clay suspended in water is treated with sulphurous acid by introducing into the clay-suspension for instance gaseous sulphur dioxide until the evolution of carbonic acid from the carbonates of calcium and magnesium present in the treated clay has come to an end and a sufficient excess of sulphurous acid is present for dissolving lime and magnesia as bisulphites.

Hereafter the clay thus treated is separated from the solution, this being carried out for instance by filtering or centrifugal separation. By this treatment the largest part of the strongest fluxes, namely lime and magnesia are removed from the clay as well as alkaline oxides if such have been present. There may still remain small quantities of the said substances which, however, may be extracted by repeating the treatment.

Now the impurities still remaining in the clay are substantially present in the form of iron compounds and the extraction of iron is carried out in the following manner. The clay is suspended in dilute sulphuric acid to which has been added a large amount of ferrous sulphate and this suspension is heated to an elevated temperature say of 90–100° centigrade in a vat the inside of which is lined with lead and the clay being well agitated during such treatment. After the elapse of about ten minutes, the dilute acid has already eliminated the iron compounds contained in the clay. Preferably a solution containing 10% sulphuric acid and about 10% ferrous sulphate may be employed as acid mixture. The clay purified in this way is now separated from the solution, this being effected by filtering or centrifugal separation. The separated clay is still saturated with the solution containing a considerable percentage of iron and therefore it has to be repeatedly washed with pure or slightly acidulated water and thus cleared from the iron salts. The effect of this process will be readily seen from the following statements. The primary material contained for instance 45.4% $SiO_2$, 9.0% $Fe_2O_3$, 28.0% $Al_2O_3$, 11.9% CaO, 0.2% $Mn_3O_4$, 0.8% $Na_2O$ and 4.1% MgO. After the treatment with sulphurous acid until the evolution of gas ceases, in the above described manner, the composition of the clay was the following: 53.2% $SiO_2$, 10.1% $Fe_2O_3$, 35.1% $Al_2O_3$, 0.6% CaO, no $Mn_3O_4$, no $Na_2O$ and 0.20% MgO. After having further been treated with acid and ferrous salt according to the present process, the clay finally showed the following composition: 63.0% $SiO_2$, 1.25% $Fe_2O_3$, 34.6% $Al_2O_3$, 0.55% CaO, no manganese, no alkaline oxide, and 0.18% MgO. Thus the impurities with the exception of practically immaterial residues have been removed by subjecting the clay to our process.

In order to work up the solution separated from the purified clay the said solution is treated with metallic iron or with sulphurous acid to more or less reduce the ferric salts present and is then brought to crystallization. By this the solution is deprived of the part of water that is necessary for the crystallization and the expense for the concentration by evaporation is reduced. The remaining cold saturated ferrous sulphate solution containing more or less ferric salt may be used again.

The presence of ferric salt such as ferric sulphate in this solution is not a drawback, for it increases the solubility of ferrous salt such as ferrous sulphate in a quite extraordinary manner. We therefore may advantageously start our heretofore described process with a mixture containing a considerable amount of ferric salt such as ferric sulphate. This means facilitates in a notable degree the separation of ferrous salts from the waste-lyes.

The clay, treated in this way, is highly plastic and fire-proof, because there are practically no fluxes present and it shows nearly a white color after burning.

The removal of lime from the clay before the extraction of iron is not in all cases necessary, because there are many clays which contain iron compounds but not lime compounds. A clay of the following composition: 47.1% $SiO_2$, 32.5% $Al_2O_3$, 7.6% $Fe_2O_3$, 12.8% loss of red heat was treated with sulphuric acid and ferrous sulphate in the above explained manner. After such treatment its composition was: 51.5% $SiO_2$, 35.1% $Al_2O_3$, 0.8% $Fe_2O_3$ and 12.6% loss at red heat. The color of the clay when burnt before treating was brick-red, when burnt after treating its color was of a light yellow.

The purifying of bauxite may be mentioned as a further example for the application of our process. The purification of this material calls for the use of a somewhat stronger sulphuric acid, for instance sulphuric acid of 20% and the said material has to be subjected to the action of this acid for a longer period of time. The content of ferrous sulphate in the sulphuric acid may again be at about 10%. Bauxite containing before treatment 17% of iron showed after a treatment performed in the above described manner only 1½% of iron. It may be noted that by this treatment also some aluminium oxide is dissolved.

The process according to the present invention is particularly adapted for purifying quartz in the form of sand. Such sand was cleaned partially by washing. The washed quartz had the following commposition: 99.23% $SiO_2$, 0.64% $Fe_2O_3$, 0.12% $Al_2O_3$, 0.01% CaO. 100 kilograms of this washed quartz sand were added to 100 litres of a solution, containing 15% sulphuric acid and 5% ferrous sulphate, and treated for a period of 15 minutes at a temperature of between 80 and 100° centigrade in a slowly rotating drum, lined with acid-proof bricks Then the acid was decanted and the sand thoroughly washed with diluted solutions of acid and ferrous salt and finally with water. After this treatment the sand had become absolutely white and showed the following composition: 99.86% $SiO_2$, 0.03% $Fe_2O_3$, 0.10% $Al_2O_3$, 0.01% CaO. This purified quartz gave when used in glass-making an absolutely clear and colorless flux, while the original quartz was only fit for being used in making deep colored glass on account of its high content of iron. Feldspar, heavy spar and celestine may be purified in the same way.

The process as described in connection with quartz is also suited for extracting iron from iron ores finally in the form of ferrous sulphate.

In order to render more economic the elimination of iron it is in many cases of advantage to dry the materials before the treatment with sulphuric acid and ferrous sulphate. This drying can be carried out either by exposing the material to the open air or in any of the known artificial manners. The advantage of this modification of our process consists in that the moisture of the material does not cause a dilution of the mixture of acid and ferrous salt during the subsequent treatment. By this the consumption of acid is reduced and the extraction of the ferric salts from the waste lye in a solid state is facilitated.

In the above examples the preferable modes of carrying out the process according to the present invention have been described. However it is evident that our process can be varied according to the raw material to be treated without leaving the scope of the present invention.

We claim—

1. Process of purifying mineral raw materials from iron, which consists in treating the said materials, while applying heat, with a watery solution of sulphuric acid, the said solution being incorporated with an addition of 5% to 10% of ferrous sulphate.

2. Process of purifying mineral raw materials from iron, which consists in treating the said materials while applying heat, with a watery solution of sulphuric acid, the said solution being incorporated with an addition of 5% to 10% of ferrous sulphate, and of ferric sulphate.

3. In a process for purifying mineral raw materials containing iron compounds the step of extracting the iron by reacting upon the raw material while applying heat with an aqueous solution of sulphuric acid containing at least 5% of ferrous sulphate.

4. In a process for purifying mineral raw materials containing iron compounds the step of extracting the iron by reacting upon the materials, while heating, with an aqueous solution of sulphuric acid containing at least 5% of ferrous sulphate and further ferric sulphate.

5. In a process for purifying mineral raw materials containing iron compounds the steps of bringing the raw material in a divided state into intimate contact with an aqueous solution of sulphuric acid containing at least 5% ferrous sulphate while heating the bulk up to an elevated temperature, so as to dissolve the iron compounds and convert them into ferric sulphate, separating the purified mineral material from the solution, washing and drying it, and treating the separated solution with a reducing agent to convert at least part of the ferric sulphate to ferrous sulphate.

6. In a process for purifying mineral raw materials containing iron compounds the steps of bringing the raw material in a divided state into intimate contact with an aqueous solution of sulphuric acid containing at least 5% ferrous sulphate while heating the bulk up to an elevated temperature, so as to dissolve the iron compounds and convert them into ferric sulphate, separating the purified mineral material from the solution, washing and drying it, reducing the ferric sulphate contained in the separated solution to ferrous sulphate to such an extent that the said solution is supersaturated with ferrous sulphate, allowing part of the ferrous sulphate to crystallize out, separating the crystallized ferrous sulphate from the solution, and using the said solution for treating a further portion of raw material.

7. In a process for purifying mineral raw materials containing iron compounds the steps of bringing the raw material in a divided state into intimate contact with an aqueous solution of sulphuric acid containing at least 5% ferrous sulphate while heating the bulk up to a temperature between 80 to 100° C., so as to dissolve the iron compounds and convert them into ferric sulphate, separating the purified mineral material from the solution, washing and drying it, reducing the ferric sulphate containing in the separated solution to ferrous sulphate to such an extent that the said solution is supersaturated with ferrous sulphate, allowing part of the ferrous sulphate to crystallize out, separating the crystallized ferrous sulphate from the solution, and using the said solution for treating a further portion of raw material.

8. In a process for purifying mineral raw materials containing iron compounds the steps of bringing the raw material in a divided state into intimate contact with an aqueous solution of sulphuric acid containing at least 5% ferrous sulphate while heating the bulk up to an elevated temperature, so as to dissolve the iron compounds and convert them into ferric sulphate, separating the purified mineral material from the solution, washing and drying it, reducing the ferric sulphate contained in the solution to ferrous sulphate by adding metallic iron, allowing part of the ferrous sulphate formed to crystallize out, separating the crystallized ferrous sulphate from the solution, and using the said solution for treating a further portion of raw material.

9. In a process for purifying mineral raw materials containing iron compounds the steps of bringing the raw material in a divided state into intimate contact with an aqueous solution of sulphuric acid containing at least 5% ferrous sulphate while heating the bulk up to an elevated temperature, so as to dissolve the iron compounds and convert them into ferric sulphate, separating the purified mineral material from the solution, washing and drying it, reducing the ferric sulphate contained in the solution to ferrous sulphate by treating the said solution with sulphurous acid, allowing part of the ferrous sulphate formed to crystallize out, separating the crystallized ferrous sulphate from the solution, and using the said solution for treating a further portion of raw material.

RICHARD STAUFER.
KAMILLO KONOPICKY.